US006108620A

United States Patent [19]
Richardson et al.

[11] Patent Number: 6,108,620
[45] Date of Patent: Aug. 22, 2000

[54] METHOD AND SYSTEM FOR NATURAL LANGUAGE PARSING USING CHUNKING

[75] Inventors: Steve Richardson, Redmond; Karen Jensen, Bellevue, both of Wash.

[73] Assignee: Microsoft Corporation, Redmond, Wash.

[21] Appl. No.: 09/312,808

[22] Filed: May 17, 1999

Related U.S. Application Data

[63] Continuation of application No. 08/896,557, Jul. 17, 1997, abandoned.

[51] Int. Cl.[7] .............................. G06F 17/27; G06F 17/21
[52] U.S. Cl. .................................................... 704/9; 704/10
[58] Field of Search ............................ 704/1, 9, 10, 251, 704/255, 257; 707/1, 4, 5, 6, 100, 104, 530, 531, 532

[56] References Cited

PUBLICATIONS

McCord, Michael C., "*Slot Grammar A System for Simpler Construction of Practical Natural Language Grammars*," Natural Language and Logic International Scientific Symposium, Hamburg, FRG, May 9–11, 1989, Proceedings, pp. 118–145.

Lappin, Shalom and McCord, Michael, "Anaphora Resolution in Slot Grammar," *Computational Linguistics*, vol. 16, No. 4, MIT Press, Dec. 1990, pp. 197–212.
Robinson, Jane J., "Diagram: A Grammar for Dialogues," Technical Note 205, Communications of the ACM, vol. 25, No. 1, Jan. 1982, p. 27–48.

*Primary Examiner*—Joseph Thomas
*Attorney, Agent, or Firm*—Joseph R. Kelly; Westman Champlin & Kelly P.A.

[57] ABSTRACT

A method and system that uses a chunking technique to guide the parsing. A chunk is a portion of the input for which the system has determined that a sufficient number of syntax rules have been applied such that further application of syntax rules to that chunk is unlikely to produce a more accurate sub-parse for that chunk. When using the chunking technique, the system selects a syntax rule to apply to the current partial parse (sub-trees) of the input sentence. The selected syntax rule has a high probability relative to other syntax rules that can be applied to the one or more potential sub-trees of the input sentence. The system then applies the selected syntax rule to the potential sub-trees of the input sentence to form a new potential sub-trees of the input sentence. When the system determines that syntax rules with low probabilities have recently been applied, the system disables application of syntax rules to a portion of parse of the input sentence (i.e., a chunk) so that that syntax rules can be applied to the other portion of the input sentence.

23 Claims, 7 Drawing Sheets

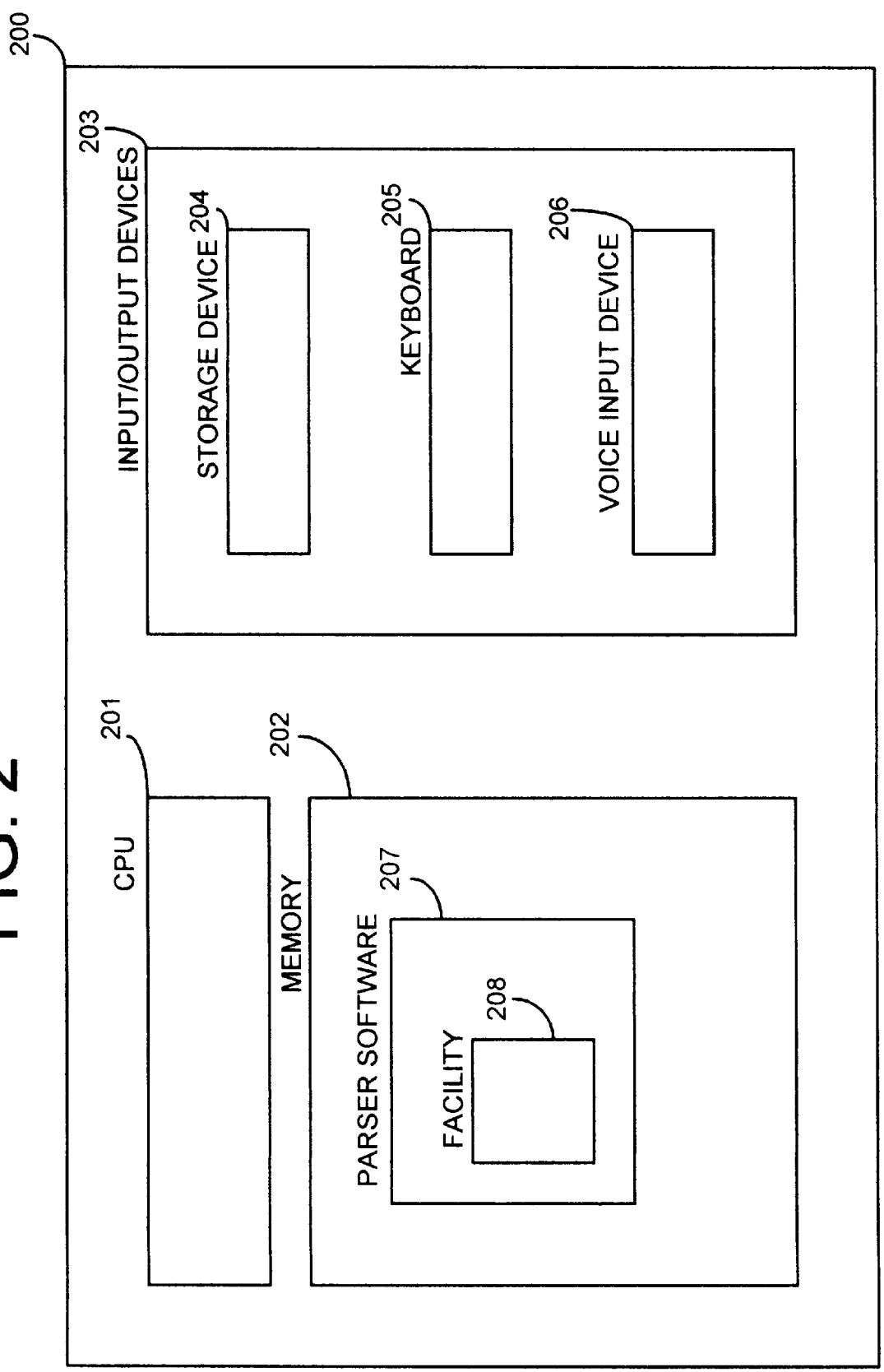

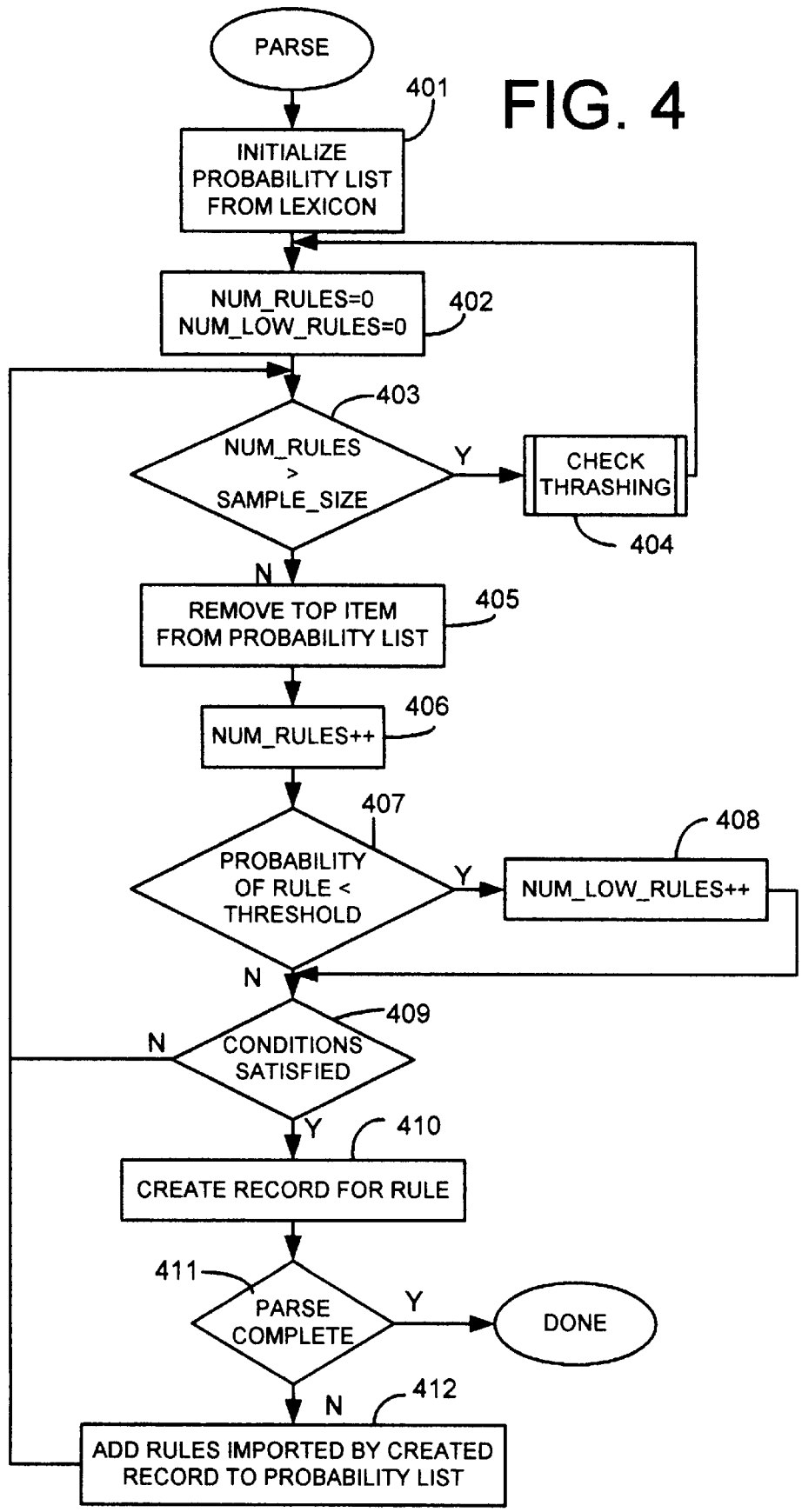

METHOD AND SYSTEM FOR NATURAL LANGUAGE PARSING USING CHUNKING

CROSS-REFERENCE TO RELATED APPLICATION

This application is a continuation of U.S. patent application Ser. No. 08/896,557, filed Jul. 17, 1997, now abandoned.

TECHNICAL FIELD

The present invention relates to the field of natural language processing, and more particularly, to a method and system for natural language parsing.

BACKGROUND OF THE INVENTION

A natural language parser is a program that takes a segment. usually a sentence, of natural language (i.e., human language, such as English) text as input and produces as output for that segment a data structure, usually referred to as a parse tree. This parse tree typically represents the syntactic relationships between the words in the input segment. Natural language parsers have traditionally been "rule-based." Such rule-based parsers store knowledge about the syntactic structure of a language in the form of syntax rules, and apply these rules to the input text segment to obtain the resulting parse tree. The parser usually stores information about individual words, such as what part-of-speech they can represent, in a dictionary or "lexicon," which is accessed by the parser for each word in the input text prior to applying the syntax rules.

Parsers apply rules in either a "top-down" or a "bottom-up" manner. In the following example, bottom-up parsing is described. To generate a parse tree, a bottom-up parser first creates one or more leaf nodes for each word of an input sentence. Each leaf node indicates a possible part-of-speech of the word. For example, the word "part" can be used as a noun or a verb part-of-speech. The parser then applies the syntax rules to generate intermediate-level nodes linked to one, two, or occasionally more existing nodes. Assuming that the parse is successful, eventually the parser will generate a single root node for a complete syntax parse tree that encompasses an entire sentence (i.e., include one leaf node for each word of the input sentence).

A bottom-up parser attempts to apply syntax rules one-at-a-time to single leaf nodes, to pairs of leaf nodes, and, occasionally, to larger groups of leaf nodes. If the syntax rule specifies that two certain types of nodes can be combined into a higher-level node and a pair of adjacent nodes match that specification, then the parser applies the rule to the adjacent nodes to create a higher-level node representing the syntactic construct of the rule. Each rule comprises specification and optional conditions. The specification indicates that certain types of syntactic constructs can be combined to form a new syntactic construct (e.g., "verb phrase=noun+ verb"), and the conditions, if any, specify criteria that need to be satisfied before the rule can succeed (e.g., plural agreement of noun and verb). For example, the words "he see" represent a noun and a verb, respectively, which can be potentially combined into the higher-level syntactic construct of a verb phrase. The specification of "verb phrase= noun+verb" indicates that an intermediate-level verb phrase node linked to the two leaf nodes representing "he" and "see" can be created. However, the syntax rule may have a condition which indicates that the noun and verb need to be in agreement as to number (singular or plural). In this example, since "he" is not in plural agreement with "see," the syntax rule does not succeed. Syntax rules whose specifications match nodes of sub-trees are rules that can be potentially (assuming the conditions are satisfied) applied to create a higher-level node. As each new node is created, it is linked to already-existing leaf nodes and intermediate-level nodes, and becomes part of the total set of nodes to which the syntax rules are applied. The process of applying syntax rules to the growing set of nodes continues until a complete syntax parse tree is generated. A complete syntax parse tree includes all of the words of the input as leaf nodes and represents one possible parse of the input.

A typical parser uses a chart data structure to track the nodes that have been created. Each node is represented by a record that is stored in the chart. A parser would typically select each syntax rule and determine whether it can be applied to the records currently in the chart. If the rule can be applied, then the parser checks the conditions on each of the constituents of the syntax rule. If the conditions are satisfied, then the rule succeeds and the parser creates a new record and stores it in the chart. Each record, thus, corresponds to a sub-tree that may potentially be part of the complete syntax parse tree. When a record is added to the chart that encompasses all the words of the input sentence, then the tree represented by the record is a complete parse of the input sentence.

The parser can conduct an exhaustive search for all possible complete syntax parse trees by continuously applying the rules until no additional rules can be applied. The parser can also use various heuristic or statistical approaches to guide the application of syntax rules so that the rules that are most likely to result in a complete syntax parse tree are applied first. Using such approaches, after one or a few complete syntax parse trees are generated, the parser typically can terminate the search because the syntax parse tree most likely to be chosen as best representing the input is probably one of the first generated syntax parse trees. If no complete syntax parse trees are generated after a reasonable search, then a fitted parse can be achieved by combining the most promising sub-trees together into a single tree using a root node that is generated by the application of a special aggregation rule.

In one parser, the syntax rules are ordered by their probabilities of successful application. The probabilities used are based on syntactic analysis of a number of standard input sentences. The statistical ordering of syntax rules is described in U.S. Pat. No. 5,752,052, entitled "Method and System for Bootstrapping Statistical Processing, Into a Rule-Based Natural Language Parser", which is hereby incorporated by reference. The parser attempts to apply syntax rules in the order of their probabilities. In general, application of a great many less probable rules is avoided, saving the time of their application.

Although such parsers can theoretically generate all possible syntax parse trees for an input sentence, they have the serious drawback that, despite statistical rule ordering, the complexity of the generated intermediate parse trees grows exponentially with the length of the input sentence being parsed. This exponential growth can quickly exceed memory and response time constraints for a particular application program that uses the parser. When memory or response time constraints have been exceeded, and parsing is stopped, the parser may have failed to produce a parse tree that spans all of the words in the input sentence. In particular, the parser may have failed to parse certain portions of the input. Thus, the resulting parse tree is completely uninformative as to those portions that were not parsed.

SUMMARY OF THE INVENTION

The present invention provides a method and system that uses a chunking technique to guide the parsing. A chunk is a portion of the input for which the system has determined that a sufficient number of syntax rules have been applied such that further application of syntax rules to that chunk is unlikely to produce a more accurate sub-parse for that chunk. When using the chunking technique, the system selects a syntax rule to apply to the current partial parse (sub-trees) of the input sentence. The selected syntax rule has a high probability relative to other syntax rules that can be applied to the one or more potential sub-trees of the input sentence. The system then applies the selected syntax rule to the potential sub-trees of the input sentence to form a new potential sub-trees of the input sentence. When the system determines that syntax rules with low probabilities have recently been applied, the system disables application of syntax rules to a portion of parse of the input sentence (i.e., a chunk) so that that syntax rules can be applied to the other portion of the input sentence.

BRIEF DESCRIPTION OF THE DRAWINGS

FIG. 2 is a high-level block diagram of the general-purpose computer system upon which the parser preferably operates.

FIG. 4 is a flow diagram showing the steps performed by the parser when parsing an input string.

DETAILED DESCRIPTION OF THE INVENTION

The present invention provides a method and system for generating a syntax parse tree that represents the results of syntactic analysis of input using a "chunking" technique. The chunking parser of the present invention controls the application of syntax rules to the input sentence during parsing. In particular, when the chunking parser identifies a "chunk," it alters the application of the syntax rules so that syntax rules are applied that encompasses portions to the left of the chunk when parsing the input sentence from the right to the left. By altering the application of the syntax rule, the parser proceeds to apply syntax rules that encompass portions of the input sentence to the left. A "chunk" is a portion of the input sentence to which a sufficient number of syntax rules have been applied such that further application of rules to that chunk is unlikely to produce a more accurate sub-parse for the chunk. Chunking is especially useful in parsing long, syntactically complex sentences in which it may be otherwise impractical or impracticable to parse such sentences because of time and memory constraints.

The chunking parser selects chunks that preferably correspond to natural phrase and clause boundaries. Other parsers may use language features, such as semi-colons, to recognize phrases and clauses within long input sentences. However, such prior techniques are inadequate when, for example, a long input sentence contains no such language feature to delineate phrases or clauses.

The chunking parser identifies a chunk when it recognizes that thrashing is occurring in the application of the syntax rules. Thrashing occurs when the syntax rules that have recently been applied have a low probability of identifying syntactic constructs that are part of the complete syntax parse of the input sentence. A chunk, which is intended to encompass a complete clause or phrase, is defined in terms of minimal path length within a chart data structure that is used to track the building of a complete syntax parse tree. The minimal path length of a record in the chart is the smallest number of records presently in the chart that together encompass, without overlap, all the words of the input sentence that follow the last word that the record encompasses.

Figure 1A:
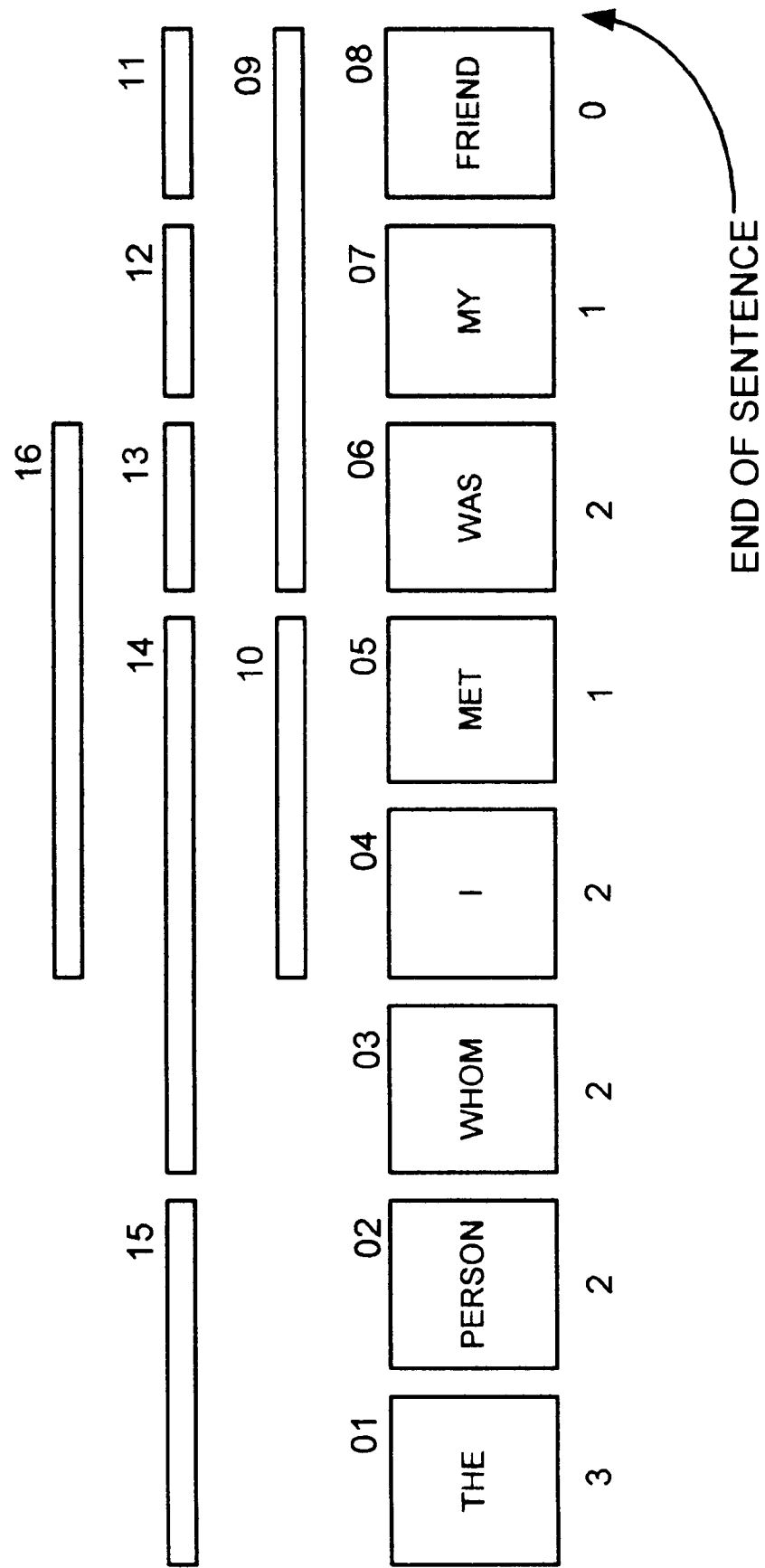
FIG. 1A illustrates a current chart of an example sentence and the minimal path lengths.

FIG. 1A illustrates a current chart of an example sentence and the minimal path lengths. The example sentence being parsed is "The person whom I met was my friend." The current chart contains leaf records 1A01-1A08 for each word in the sentence and non-leaf records 1A09-1A16 for higher-level syntactic constructs. Each non-leaf record corresponds to a root record of a sub-tree of the chart. Each sub-tree within the chart is potentially part of the complete syntax parse tree. The width of each record in FIG. 1A indicates the leaf records that it encompasses. For example, non-leaf record 1A09 encompasses the three leaf records 1A06-1A08 that correspond to words "was my friend," and non-leaf record 1A14 encompasses the leaf record 1A03 that corresponds to the word "whom," and the non-leaf record 1A10 that corresponds to the words "I met." The numbers below each leaf record indicates the current minimal path length for that record. For example, the minimal path length for the leaf record 1A08 that corresponds to the word "friend" is 0, since "friend" is the last word in the sentence. The minimal path length for the leaf record 1A05 that corresponds to the word "met" is 1, since the single record 1A09 encompasses all the leaf records to the right of that word. The minimal path length for the leaf record 1A01 that corresponds to the word "the" is 3, since records 1A02, 1A14, and 1A09 together encompass all the leaf records to the right without overlap.

When the chunking parser detects thrashing, the parser identifies the current chunk. The parser first identifies the left-most pair of adjacent leaf records in which the left record of the pair has a minimal path length of 2 and the right record of the pair has a minimal path length of 1. For example, in FIG. 1A, the leaf records 1A04–1A05 that correspond to the words "I met" are the left-most adjacent leaf records with such minimal path lengths. The leaf records to the right of that pair of records comprise the current chunk. In this example, the current chunk comprises leaf records 1A06–1A08.

Figure 1B:
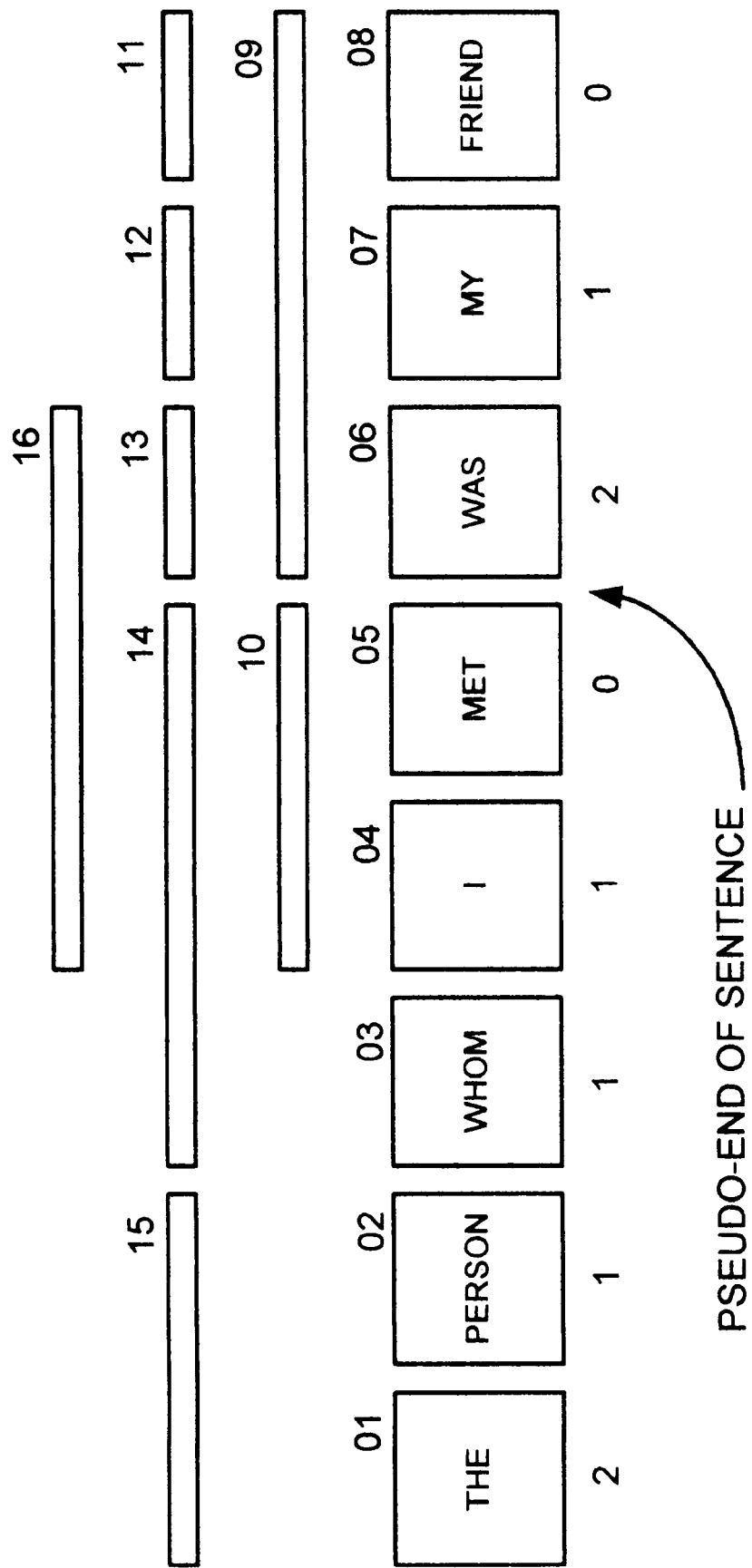
FIG. 1B illustrates the current chart with a pseudo-end of the sentence.

When the current chunk is identified, the parser sets a pseudo-end of the sentence just to the left of the current chunk. In this example, the pseudo-end of the sentence is at the leaf record for the word "met." The parser also sets the minimal path length for the leaf record at the pseudo-end of the sentence to 0. The minimal path length of a record is thus defined as the smallest number of records presently in the chart that together encompasses without overlap the words that follow the last word (i.e., right-most word) that the record encompasses to the pseudo-end of the sentence. FIG. 1B illustrates the current chart with a pseudo-end of the sentence. The minimal path length of record 1B05 that corresponds to the word "met" and that is immediately to the left of the pseudo-end of the sentence is 0. The minimal path length of record 1B02 that corresponds to the word "person" is 1, since a single record 1B14 encompasses all the words to the pseudo-end of the sentence. The minimal path length of record 1B01 that corresponds to the word "the" is 2, since the two records 1B02 and 1B14 encompass all the words to the pseudo-end of the sentence.

Once a new pseudo-end of the sentence is identified, then the probability associated with the successful application of various syntax rules changes. In particular, if the probability of successful application of a syntax rule is conditioned upon the minimal path length of the records to which the rule is to be applied, then the probability of the rule changes when a new pseudo-end of the sentence is defined. It is preferable that the probabilities of rules whose application would encompass only leaf records to the right of the pseudo-end of the sentence becomes very low. Thus, the parser will select rules to apply that encompass at least one leaf record to the left of the pseudo-end of the sentence. As a result of such selection, the parser will focus its parsing on records to the left of the pseudo-end of the sentence. Therefore, by appropriately detecting thrashing, the parser will typically provide at least a partial parse to all portions of the sentence within the memory and time constraints.

FIG. 2 is a high-level block diagram of the general-purpose computer system upon which the parser preferably operates. The computer system 200 contains a central processing unit (CPU) 201, a computer memory (memory) 202, and input/output devices 203. The input/output devices include a storage device 204, such as a hard disk drive, a keyboard 205, and optionally a voice input device 206. The parser software 207 preferably resides in the memory 202 and executes on the CPU 201. The parser may be initially loaded into memory from a computer-readable medium such as a CD-ROM. Input strings to be parsed by the parser may be retrieved from the storage device 204. Typed input strings may be received for parsing from keyboard 205, and spoken input strings received and interpreted by the voice input device 206. While the parser is preferably implemented on a computer system configured as described above, it may also be implemented on computer systems having different configurations.

Figure 3A:
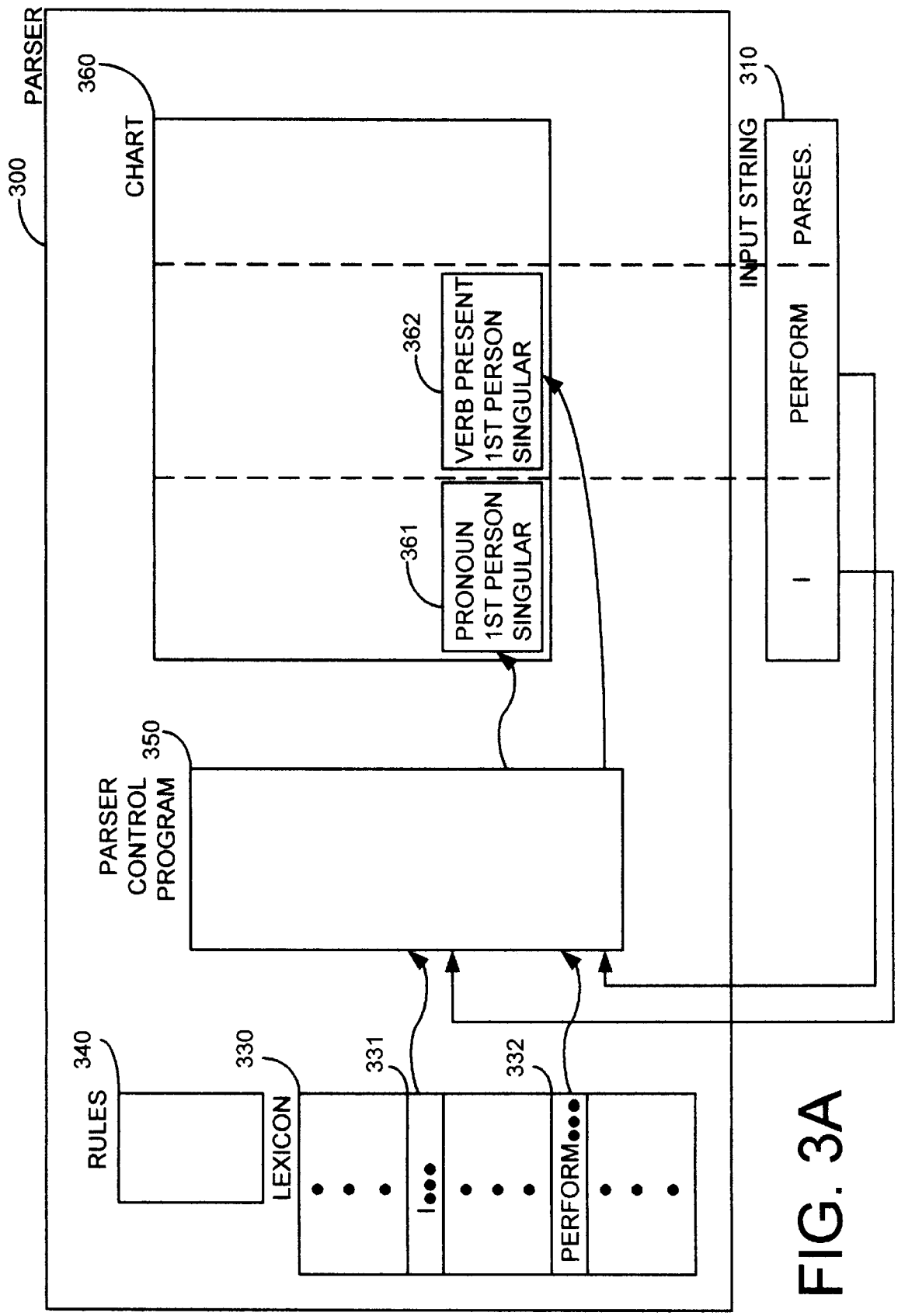
FIGS. 3A–3B are block diagrams that illustrate the operation of a typical parser in which chunking techniques of the present invention may be implemented.
Figure 3B:
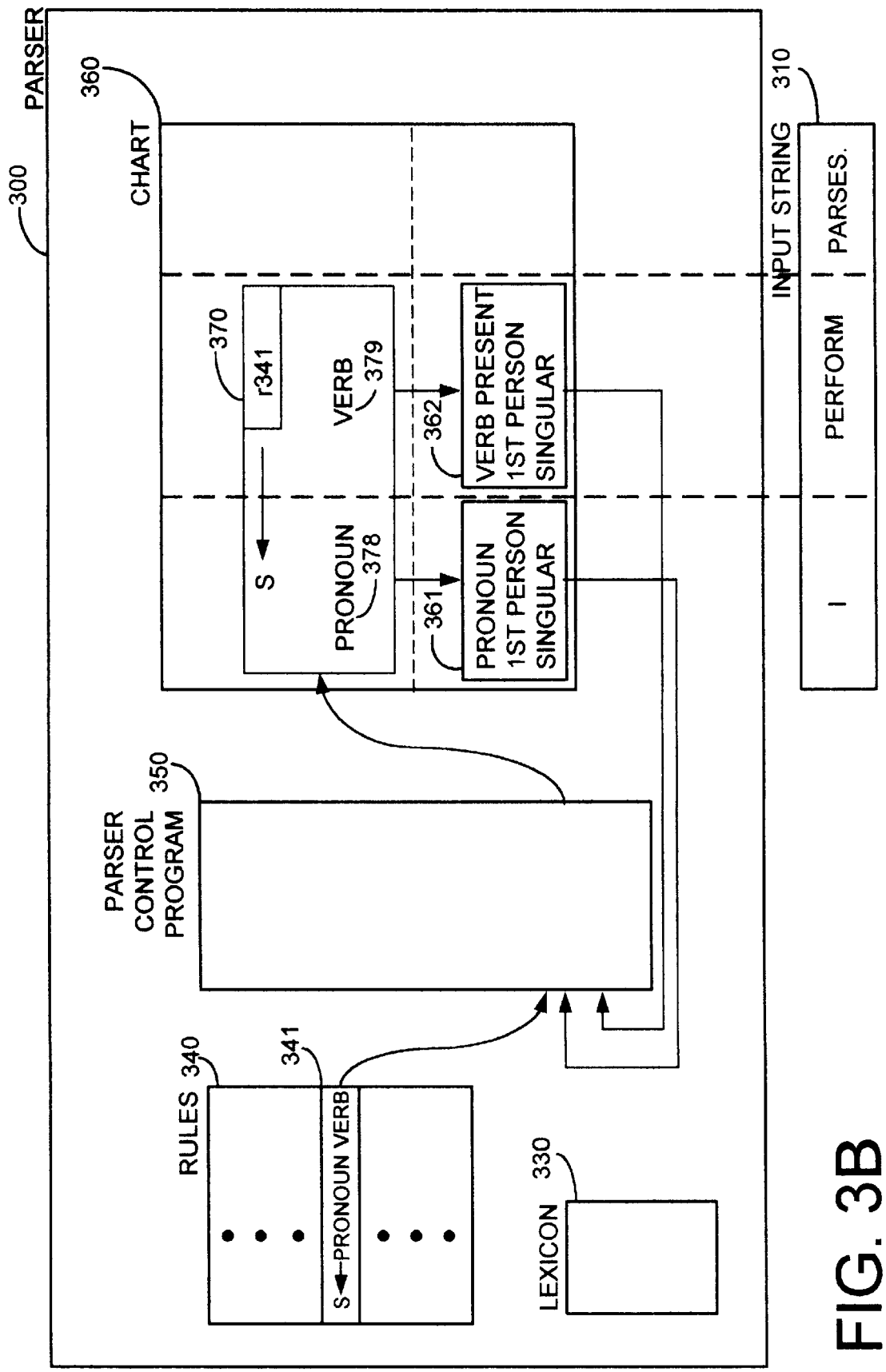

FIGS. 3A–3B are block diagrams that illustrate the operation of an embodiment of the chunking system. FIG. 3A shows the organization of the parser and illustrates the application of entries in the lexicon. The parser 300 operates to parse an input string 310 (e.g., "I perform parses"). The parser is comprised of a lexicon 330 that contains one or more entries for each word known to the parser. Each lexicon entry specifies a part of speech for one word, as well as other associated information, such as person, number, and tense. As an example, the lexicon 330 contains lexicon entry 331 that specifies the word "I" has the part of speech "pronoun," the person "first person," and the number "singular." These values are usually encoded to reduce the size of the lexicon. The parser 300 also contains a set of augmented phrase structure grammar rules ("syntax rules") 340. The parser 300 further contains a parser control program 350. The parser control program applies lexicon entries and rules to produce new records in a working area for assembling a parse tree for the input string called a chart 360, in order to eventually produce one or more sentence records (i.e., that encompass a leaf record for each word) in the chart.

At the beginning of a parse of input string 310, the chart 360 contains no records. The parser control program 350 begins by selecting one or more lexicon entries corresponding to words in the input string 310 to apply and by creating a record corresponding to each lexicon entry in the chart 360. (For words having more than one possible part of speech, the lexicon contains multiple entries. The parser control program may select one or more of these multiple lexicon entries for addition to the chart.) For instance, the parser control program selects lexicon entry 331, which corresponds to the word "I" in the input string 310, and creates record 361 in the chart when such a word appears in the input string 360. The record 361 contains information copied from the lexicon entry, e.g., the part of speech "pronoun," the person "first person," and the number "singular." In the same way, the rule lexicon application program 350 creates record 362 in the chart 360 by copying information from a lexicon entry 332 corresponding to the word "perform" in the input string 310. The process of creating a record in the chart from a lexicon entry for a word is also known as generating a lexical characterization of the word.

FIG. 3B demonstrates the application of the rules. For this example, a small set of simplified rules are described in order to facilitate the discussion. The rules 340 each specify the creation of a new record in the chart 360 to represent the combination of one or more records. The rules 340 are designed such that, by repeated application of various rules, a record is eventually created that represents the entire input string. Because the input string preferably corresponds to one sentence (but may correspond to any similar segment of text), the ultimate record is a record that represents an entire sentence, or a "sentence record." Each rule contains four parts: the type and order of records combined by the rule, the type of result record produced by the rule to represent the combination of the combined records, conditions that regulate when a rule may create a result record, and structure-building actions that add information to the newly created record. If the conditions are satisfied, the parser control program 350 creates a result record of the type specified by the rule in the chart 360 and performs the structure-building action specified by the rule. The process of creating a record in the chart from a rule is also known as generating a syntactic characterization of a group of words in the input string.

For instance, rule 341 specifies combining a pronoun followed by a verb into a Sentence. Rule 341 specifies that, in order for a result record to be created, the pronoun and verb must agree in person and number. Such a rule may be written as follows:

| rule # | combined record types | conditions | created record type |
|---|---|---|---|
| 341 | pronoun verb | person, number agreement | sentence |

In order to combine records 361 and 362, representing a pronoun and a verb respectively, the parser control program 350 attempts to apply rule 341, since it combines a pronoun followed by a verb. The parser control program 350 evaluates the conditions of rule 341: as record 361 is first person and record 362 is first person, the records to be combined agree in person; as record 361 is singular and record 362 is singular, the records to be combined agree in number. Thus, the conditions of rule 361 are satisfied. The parser control program 350 therefore creates result record 370 in the chart to represent the combination of records 361 and 362 into a sentence, as shown by the transformation shorthand "pronoun verb→S." One function of the structure-building actions is to insert into created record pointers to each combined record so that, when a sentence record is ultimately created that represents the entire input string (Result record 370 only represents the substring "I perform."), it is at the head of a parse tree that represents the sentence at each level of syntactic detail. For example, the result record 370 contains a pronoun pointer 378 to record 361 and a verb pointer 379 to record 362. In the parse tree, each leaf node corresponds to a record created from a lexicon entry, and each non-leaf node to a record created from a rule.

The chunking system calculates a heuristic score, referred to as the Probability of Discreteness ("POD") score, for each syntactic construct identified when parsing the input. Each identified syntactic construct is represented by a non-leaf node, which in turn is represented by a record created from a rule. The POD score reflects the likelihood that the syntactic structure represented by the node, and the sub-tree for which it is the root node, corresponds to a syntactic construct that would be identified as correct by a human reader of the input. The higher the POD score, the more likely that the sub-tree will end up as part of a complete syntax parse tree.

The parser recognizes thrashing by collecting statistics on rules as they are applied. A sample size is selected, and each time that number of rules equal to the sample size has been applied during rule application, a ratio is calculated by dividing the number of rules applied with probabilities of successful application below a threshold value by the sample size. When this calculated ratio rises above an experimentally determined value, the parser recognizes that rule application has begun to thrash, and a local region of low probability in the search for a complete syntax parse tree has been reached. In an embodiment of the invention, the value of the ratio above which thrashing has begun to occur is 0.5. The thrashing condition is symbolically expressed as:

$$\frac{N_{p<threshold}}{N} > 0.5$$

where $N_{p<threshold}$ is the number of rules applied with probability of successful application lower than a threshold value, and N is the total number of rules applied, which is equal to the sample size.

The probability of rule application depends, in part, on the minimum path length of a record, with records of lower path length favored. In other words, rules that most quickly lead to sub-trees that span the right-most pseudo-end of the input sentence are favored. Therefore, rules are more likely to be successfully applied to records with low minimum path length values. This rule application behavior is described in detail in U.S. Pat. No. 5,752,052 entitled "Method and System for Bootstrapping Statistical Processing Into a Rule-Based Natural Language Parser", incorporated by reference above.

Once the parser has recognized that thrashing has begun, it determines a point in the input sentence that represents a natural phrase or clause boundary (i.e., a chunk), and arranges for rule application to continue at a point to the left of the boundary, under circumstances where the likelihood of successful rule application will again be high. The parser calculates the minimal path length for each of the leaf records to the left of the current pseudo-end of the sentence. In order to find the boundary, the parser scans the minimum path lengths of the words rightward from the left side until a pair of adjacent records have minimal path lengths of 2 and 1, respectively. The parser sets the new pseudo-end of the sentence to just after that pair of records. This recalculation of the minimal path length, combined with the probability-driven tendency of the parser to apply rules to records closest to the right end, or pseudo-end of the sentence, has the effect of skipping ahead in the sequence of rule application to rules that will successfully apply to the records to the left of the new pseudo-end of the sentence. When, after the application of additional rules, the parser again detects thrashing, the parser again interrupts rule application and again determines a new pseudo-end of sentence by referring to the minimum path length, and this process is repeated until the entire set of leaf records has been incorporated into either a reasonable set of intermediate sub-trees representing the parses of separate phrases and clauses, or until one or more complete spanning syntax parse trees have been generated.

The parser preferably parses input strings by applying applicable lexicon entries and rules in the order of their likelihood to produce a record in a single parse tree as indicated by their success statistics. FIG. 4 is a flow diagram showing the steps performed by the parser when parsing an input string. The steps shown are preferably repeated for each input string. Briefly, the steps shown apply rules and lexicon entries in accordance with a probability list. The probability list is a list of items, each representing either a rule or a lexicon entry, that are sorted by the success statistic of the represented rule or lexicon entry so that the closer a list entry is to the top of the list, the more likely the rule or lexicon entry that it represents is to succeed. Items are inserted in the list for lexicon entries and rules as soon as the lexicon entry or rule becomes applicable: for lexicon entries, this is immediately at the beginning of the parse, since lexicon entries can only be implicated by words in the input string, and no words are added to the input string during parsing; for rules, this is as soon as records of the type combined by the rule are present in the order specified by the rule in the chart. When the next rule or lexicon entry is to be applied, the parser removes the top item from the probability list and applies the rule or lexicon entry that it represents.

To identify when thrashing occurs, the parser counts the number of rules that are removed from the probability list and counts the number of those rules is below a threshold probability. After a predetermined sample size of rules have been counted, the parser then determines whether thrashing is occurring. Thrashing is occurring when the percentage of counted rules with a probability below the threshold is greater than a predefined percentage. When thrashing is occurring, the parser identifies the current chunk using the minimal path length and establishes a new pseudo-end of the sentence. The probability of the rules in the probability list are adjusted to account for the new pseudo-end of the sentence. For example, rules that apply to only records to the right of the pseudo-end of the sentence can be removed from the probability list. Also, the probability of rules can be adjusted based on proximity of records to which the rules are to be applied to the pseudo-end of the sentence.

In step 401, the parser inserts an item into the probability list for each lexicon entry in the lexicon that corresponds to one of the words in the input string. Each time the parser inserts an item in the probability list, the parser inserts the entry at a position such that the probability list remains sorted from the most likely to succeed rule or lexicon entry to the least likely to succeed. In steps 402–412, the parser processes one probability list entry. In step 402, the parser initializes variables to track the number of rules that are below the probability threshold. In step 403, if the number of rules recently counted equals the predefined sample size, then the parser continues at step 404, else the parser continues at step 405. In step 404, the parser invokes a routine to check for thrashing and if found, adjusts the pseudo-end of the sentence accordingly. The parser then loops to step 402 to re-initialize the variables for counting the next sample size number of rules. In step 405, the parser removes the top item from the probability list. If no rules are left, then the parser completes. In step 406, the parser increments the number of rules that have been removed since thrashing was last checked. In step 407, if the probability of the rule is less than a threshold probability, then the variable indicating the number of such rules is incremented in step 408. In step 409, if the conditions of the rule are satisfied, then the parser continues at step 410, else the parser loops to step 403. Alternatively, the sample size may include only rules for which the conditions of the rules are satisfied. In such a case, step 409 would be moved to prior to steps 406, 407 and 408. In step 410, the parser creates a record in the chart for the applied rule or lexicon entry corresponding to the removed probability list item. For items corresponding to lexicon entries, step 410 involves copying information, (e.g., part of speech), into a new record in the chart. For items corresponding to rules, step 410 involves copying information from the constituent records combined by the rule into a new record as specified by the rule, as well as preferably storing pointers to the constituent records in the new record. In step 411, if the parse has been completed by the creation of the new record in step 410, then these steps conclude, else the parser continues at step 412. The parser preferably determines whether the parse has been completed by determining whether the record created in step 410 is a sentence record. If so, the parser deems the parse to have completed. In step 412, the parser identifies any rules implicated by the record created in step 410 and inserts a new item in the probability list for each. Step 412 is preferably facilitated by maintaining an index of the rules according to the types of records combined by each rule, which the parser consults to quickly determine which rules may be implicated by the creation of a result record in step 410. The parser continues at step 403 to remove the next item from the probability list.

Figure 5:
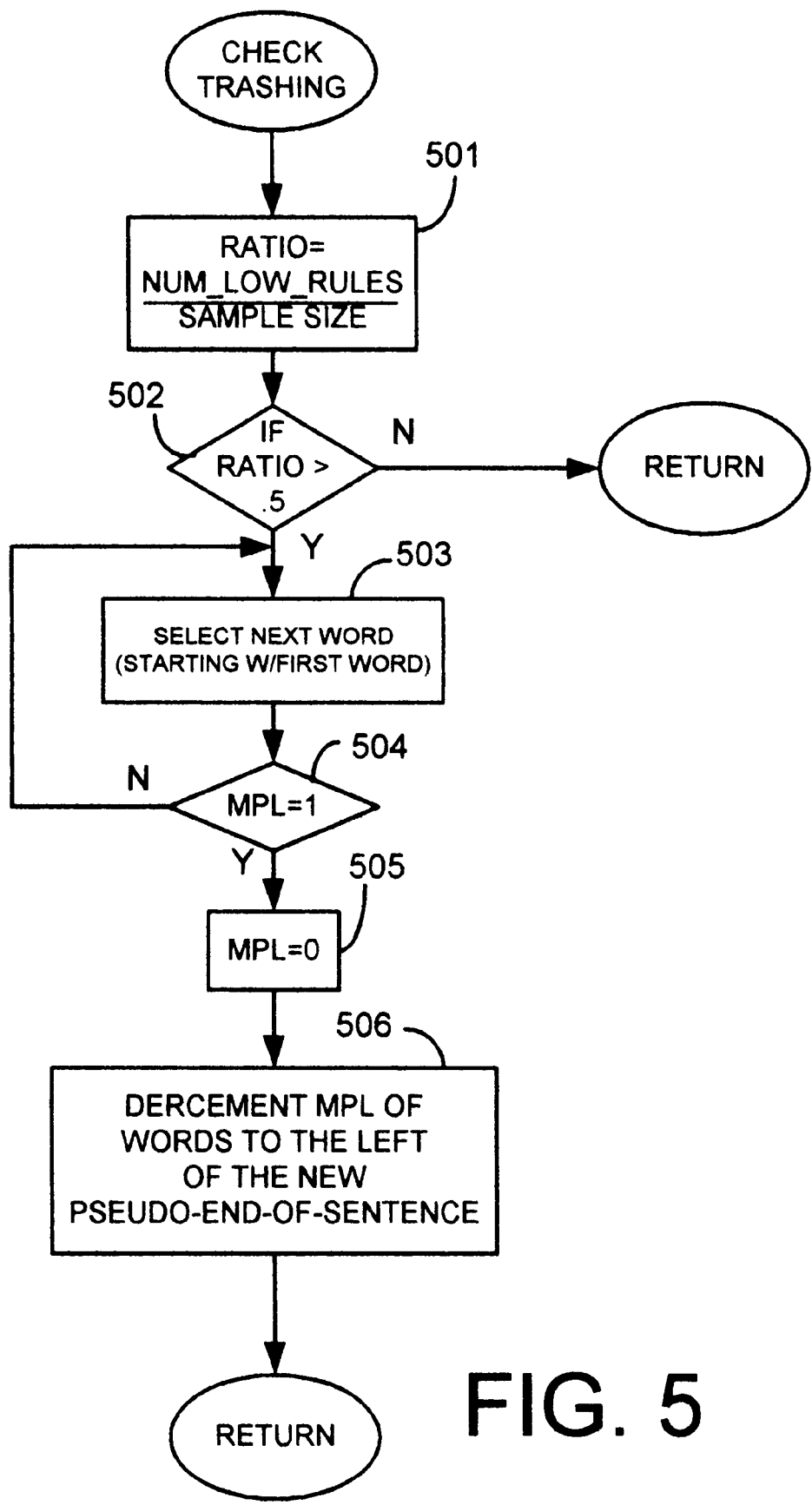
FIG. 5 is a flow diagram of an implementation of a routine to check whether thrashing is occurring.

FIG. 5 is a flow diagram of an implementation of a routine to check whether thrashing is occurring. The routine determines if thrashing is occurring and if so, identifies the current chunk and sets the pseudo-end of the sentence to the left of the current chunk. In step 501, the routine computes the ratio of the number of rules with a probability below a threshold to the number of rules in the sample size. In step 502, if the calculated ratio is greater than 0.5 or some other predetermined threshold, then the routine continues at step 503, else the routine returns. In steps 503–504, the routine identifies the left-most word in the input sentence with a minimal path length of 1. In step 503, the routine selects the next word starting with the first word in the sentence. In step 504, if the minimal path length of the selected word is 1, then the routine continues at step 505, else the routine loops to step 503 to select the next word. In step 505, the routine sets the pseudo-end of the sentence to the left of the identified chunk and sets the minimal path length of the selected word to 0. In step 506, the routine decrements the minimal path length of the words to the left of the new pseudo-end of the sentence so that they are consistent with the new pseudo-end of the sentence.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

What is claimed is:

1. A method in a computer system for parsing input in a language, the language having a grammar described by syntax rules, each syntax rule having a probability indicating a likelihood that the syntax rule will lead to a final parse of the input, the method comprising repeating the following until the final parse is generated:

selecting a syntax rule to apply to a current partial parse of the input, the selected syntax rule having a high probability relative to other syntax rules that can be applied to the current partial parse of the input;

applying the selected syntax rule to the current partial parse of the input to form a new current partial parse of the input;

determining whether syntax rules with low probabilities have been recently applied; and when it is determined that syntax rules with low probabilities have recently been applied, disabling application of syntax rules to a portion of the current partial parse of the input so that that syntax rule application can be focused on the other portion of the current partial parse of the input.

2. The method of claim 1 wherein syntax rules are applied to the input from the end of the input to the beginning of the input.

3. The method of claim 2 wherein the portion of the current partial parse of the input is a portion from a certain word to the end of the input.

4. The method of claim 1 including calculating a minimum path length for each word of the input, the minimum path length indicating a minimum number of syntactic constructs of the current partial parse of the input that encompass the word to the end of the input.

5. The method of claim 4 wherein the disabling occurs for words to the right of the left-most word with a minimum path length of 1.

6. The method of claim 1 including determining that syntax rules with low probabilities have recently been applied when a ratio of a number of syntax rules applied below a threshold probability to a total number of syntax rules applied that exceeds a threshold ratio.

7. A method in a computer system for parsing an input segment, the input segment comprising words, the method comprising:

identifying syntax rules to be applied to a current partial parse of the input segment;

applying the identified syntax rules to the current partial parse of the input segment;

determining whether thrashing is occurring in the applying of the identified syntax rules; and when it is determined that thrashing is occurring,
       selecting a portion of the input segment on which to focus the applying of syntax rules; and
       adjusting the identifying of syntax rules so that rules that are to be applied to the selected portion are identified.

8. The method of claim 7 wherein the identifying of syntax rules identifies syntax rules based on their probability of being part of a complete syntax parse tree for the input segment.

9. The method of claim 7 wherein the selected portion is to the left of the left-most word of the input segment for which a single syntax rule has been applied that encompasses all the words to the right.

10. The method of claim 9 wherein all the words to the right include words to a pseudo-end of the input segment.

11. The method of claim 9 wherein all the words to the right include words to the end of the input segment.

12. The method of claim 7 wherein the selecting of a portion is based on a minimal path length of the words of the input segment.

13. The method of claim 12 wherein the minimal path length of a word is the smallest number of applied syntax rules that encompass each word to the right of the word without overlap.

14. A computer-readable medium having instructions for causing a computer system to parse an input segment, the input segment comprising words by repeating the following until a complete parse is generated:

identifying a syntax rule to be applied to a current partial parse of the input segment;

applying the identified syntax rule to the current partial parse of the input segment;

determining whether syntax rules with a low probability of leading to a complete parse have recently been applied; and when it is determined that that such syntax rules have recently been applied, establishing a pseudo-end of the input segment so that syntax rules that previously had a low probability now have a higher probability and are thus more likely to be identified.

15. The computer-readable medium of claim 14 wherein the identifying of syntax rules identifies syntax rules is based on their probability of being part of a complete syntax parse tree for the input segment.

16. The computer-readable medium of claim 14 wherein the pseudo-end of the input segment is to the left of the left-most word of the input segment for which a single syntax rule has been applied that encompasses that leftmost word and all the words to the right.

17. The computer-readable medium of claim 16 wherein all the words to the right include words to a pseudo-end of the input segment.

18. The computer-readable medium of claim 14 wherein the establishing of the pseudo-end of the input segment is based on a minimal path length of the words of the input segment.

19. The computer-readable medium of claim 18 wherein the minimal path length of a word is the smallest number of applied syntax rules that encompass each word to the right of the word without overlap.

20. A parser for generating a parse tree data structure for an input segment, comprising:

a component for determining syntax rules that are applicable to records currently in a chart for the input segment and for storing an indication of each determined syntax rule in a list;

a rule application component for selecting a syntax rule indicated by the list and applying the syntax rule to the records currently in the chart; and a thrashing detection component for determining whether thrashing is occurring and for adjusting the selecting of syntax rules so that syntax rules are applied to certain portions of the input segment.

21. The parser of claim 20 wherein the indications of the rules in the list are sorted based on a probability that each syntax rule will lead to a complete syntax tree.

22. The parser of claim 20 wherein the thrashing detection component determines that thrashing is occurring when syntax rules with low probabilities of leading to a complete syntax tree are being applied.

23. The parser of claim 20 wherein thrashing detection component identifies a portion of the input segment on which to focus further application of syntax rules.

* * * * *

UNITED STATES PATENT AND TRADEMARK OFFICE
CERTIFICATE OF CORRECTION

PATENT NO. : 6,108,620
DATED : August 22, 2000
INVENTOR(S) : Steve Richardson et al.

It is certified that error appears in the above-identified patent and that said Letters Patent is hereby corrected as shown below:

References: 20 References cited by Examiner with Notice of Allowance not show on Patent. Under [56] U.S. Patent Documents. Please insert the following: --

| Patent No. | Date | Inventor | Class |
|---|---|---|---|
| 4,942,526 | 7/1990 | Okajima, et al. | 704/10 |
| 4,984,178 | 1/1991 | Hemphill, et al. | 704/255 |
| 5,606,155 | 10/1991 | Van Zuijlen | 704/9 |
| 5,146,406 | 9/1992 | Jensen | 704/9 |
| 5,418,717 | 5/1995 | Su, et al. | 704/9 |
| 5,493,508 | 2/1996 | Dangelo, et al. | 704/9 |
| 5,528,491 | 6/1996 | Kuno, et al. | 704/9 |
| 5,537,317 | 7/1996 | Schabes, et al. | 704/9 |
| 5,617,578 | 1/1997 | Kroll, et al. | 704/9 |
| 5,687,384 | 11/1997 | Nagese | 704/9 |
| 5,694,559 | 12/1997 | Hobson, et al. | 345/336 |
| 5,752,052 | 5/1998 | Richardson, et al. | 704/9 |
| 5,799,269 | 8/1998 | Schabes, et al. | 704/9 |
| 5,926,784 | 7/1999 | Richardson, et al. | 704/9 |
| 5,960,384 | 9/1999 | Brash | 704/9 |
| 5,963,894 | 7/1990 | Richardson, et al. | 704/9 |

UNITED STATES PATENT AND TRADEMARK OFFICE
CERTIFICATE OF CORRECTION

PATENT NO.    : 6,108,620
DATED         : August 22, 2000
INVENTOR(S)   : Steven Richardson, et al.

It is certified that error appears in the above-identified patent and that said Letters Patent is hereby corrected as shown below:

Foreign Patent Documents
| | | | | |
|---|---|---|---|---|
| JP-362186360 | A | 8/1987 | Japan | Kumuro |
| JP-407141367 | A | 6/1995 | Japan | Yoshimi |
| JP-407182345 | A | 7/1995 | Japan | Kugimiya |
| JP-407244666 | A | 9/1995 | Japan | Matsuo et al. |

Signed and Sealed this

Twenty-first Day of August, 2001

*Attest:*

*Attesting Officer*

NICHOLAS P. GODICI
*Acting Director of the United States Patent and Trademark Office*